United States Patent [19]
Sherman et al.

[11] Patent Number: 6,091,933
[45] Date of Patent: Jul. 18, 2000

[54] MULTIPLE SATELLITE SYSTEM POWER ALLOCATION BY COMMUNICATION LINK OPTIMIZATION

[75] Inventors: Richard H. Sherman, Fremont; Vijaya Gallagher, San Jose; John J. Y. Huang, Saratoga, all of Calif.

[73] Assignee: Globalstar L.P., San Jose, Calif.

[21] Appl. No.: 08/778,908

[22] Filed: Jan. 3, 1997

[51] Int. Cl.$^7$ .................................................. H04B 7/185
[52] U.S. Cl. .......................... 455/13.1; 455/427; 455/453; 455/504
[58] Field of Search ..................... 455/427, 453, 455/432, 12.1, 13.1, 13.4, 522, 504, 506, 560

[56] References Cited

U.S. PATENT DOCUMENTS

| | | | |
|---|---|---|---|
| 5,574,984 | 11/1996 | Reed et al. | 455/69 |
| 5,590,395 | 12/1996 | Diekelman | 455/13.1 |
| 5,625,868 | 4/1997 | Jan et al. | 455/13.4 |
| 5,664,006 | 9/1997 | Monte et al. | 455/405 |

Primary Examiner—Thanh Cong Le
Assistant Examiner—Darnell R. Armstrong
Attorney, Agent, or Firm—Perman & Green LLP

[57] ABSTRACT

A satellite communications system is described. The system includes a plurality of satellites, each of which transmits one or more forward links containing traffic to one or more terrestrial users. Each forward link of each of the satellites has a maximum radiation limit. At least one terrestrial user is capable of concurrently receiving at least two of the forward links. The concurrently received forward links redundantly contain the traffic addressed to the user. A computing center has a traffic controller for allocating the traffic to the satellites using gateways. The traffic controller includes a fading model descriptive of fading characteristics for each of the one or more forward links; a link performance model descriptive of losses in each of the forward links; and a power allocation model for computing a traffic allocation for each satellite of the constellation of satellites. The traffic allocation causes transmitted satellite power to be less than the maximum radiation limit for each link. The traffic control system may be located within a gateway so as to optimize traffic associated with that gateway alone. The optimization may also be directed to minimize total radiation from all forward links for particular satellites.

10 Claims, 8 Drawing Sheets

MULTIPLE SATELLITE SYSTEM POWER ALLOCATION BY COMMUNICATION LINK OPTIMIZATION

BACKGROUND OF THE INVENTION

1. Field of the Invention

This invention is related to multiple satellite communication systems. In particular, it is related to traffic control in a satellite network for optimizing link allocation.

2. Discussion of Related Art

Terrestrial cellular communication systems are well known. Multiple Satellite communication systems complement terrestrial cellular communication systems to augment traffic handling capacity and service areas where wire or cellular networks have not reached. Satellite systems came into existence in response to the need for efficient and economical mobile communications. In general, the satellites act as a transponder, or "bent pipe", receiving ground based transmissions from one location and beaming the repeated transmission back down to another location after amplification and frequency shifting, as discussed in U.S. Pat. No. 5,448,623, incorporated herein by reference in its entirety.

Terrestrial cellular communications are organized into "cells" to increase the system capacity in view of a limited number of frequencies available. For Code Division Multiple Access (CDMA) applications, a smaller cell size reduces the amount of self-interference, that is, interference generated by users of the same system. Terrestrial cellular systems use link diversity "to provide two or more inputs at the mobile reception unit so that fading phenomena among those inputs are uncorrelated", as discussed by William C. Y. Lee, "Mobile Communications Design Fundamentals" incorporated herein by reference in its entirety.

A hand-off is a feature of a terrestrial cellular system which switches a user to a new cell without interrupting the call or alerting the user. Path diversity, that is, allocation of different transmission paths between caller and base station, is generally used as part of the hand-off process. Pilot signals from the base stations are used to establish a reference clock for the reception of CDMA signals. The strength of the pilot signal determines the cell radius. The decisions on cell size are driven by the amount of power needed for mobiles on the link that returns the signal to the base station(s).

In contrast to the terrestrial cellular systems, in multiple satellite systems, a limiting factor to the size of an area to be served is the amount of satellite power needed for the forward (satellite to user) link. This is different from terrestrial cellular systems where the limiting factor for area coverage is the power of mobile subscribers in the return links. In order to use low cost satellites, there are operational limits to the amount of instantaneous power that a satellite and/or its associated beam can provide. In addition, international specifications detailing satellite emissions, such as ITU RR 2566, limit the amount of power flux density received at a point on the earth from a satellite. Like in terrestrial cellular system, satellite based CDMA systems have self-interference limits constraining system capacity. Both terrestrial and satellite systems use path diversity to improve link availability. Unlike terrestrial cellular systems, the effects of self-interference on the capacity of satellite-based mobile communication systems employing CDMA is not improved by subdividing the service area in a plurality of cells. This is because self-interference in satellite systems has different causes. The forward link using a channel in the satellite system is "orthogonal". This means that other users in that link on the same channel do not contribute to self-interference. Instead, self-interference is caused by signals from other channels, or other satellites, or other gateways sharing the same channel (i.e., frequency spectrum) and from satellite multi-beam antenna "side-lobes". Other differences include a larger link delay caused by the orbiting satellite path. This time delay makes power control by a gateway using dynamic traffic allocation less effective.

The optimization of traffic and power allocation in view of the above described considerations has been discussed in the prior art. Authors such as Gagliardi, "Satellite Communications" and B. R. Rojcic, R. L. Pickholtz, and L. B. Milsteain, "Performance of DS-CDMA with imperfect power control operating over a Low Earth Orbiting Satellite Link", IEEE Journal on Selected Areas in Communications, provide simplified analytic models. A limitation of these models is the use of simplifying assumptions such as an ideal "isoflux" antenna, and an equal amount of power in all beams, which preclude their use for power allocation optimization. An isoflux antenna provides gain sufficient to maintain received power as a constant. The fading model uses a weighted combination of Rician and Rayleigh fading. The models, however, do not account for the differences that occur with satellite elevation.

Another unsolved problem in the prior art is the optimum balance between using more diversity to improve link availability in view of satellite power usage. The orthogonal signals in the forward link are most efficiently combined coherently. A coherent combiner adds signal amplitudes. The combining efficiency is best when the signal-to-noise ratio of the received signals are balanced. Unfortunately, this may occur when one of the diversity paths is using a low elevation angle satellite. At low elevation angles an excessive amount of power may be required to support the desired signal-to-noise ratio.

The capability to make diversity decisions involving many satellites for gateways of many service areas did not exist previously. In the past, decisions were made based on information local to a service area or signal environment. While these decisions did consider operational constraints in the satellite system, satellite availability decisions were only considered implicitly as part of the operational strategies.

Also, simulations of satellites systems with explicit decision rules for picking satellite links for diversity were also employed in the past. The disadvantage of explicit decisions is that they must be reconsidered in light of other system constraints such as satellite thermal and battery limits.

The application of power allocation to the decision making process of a User Terminal Power Allocation System has been considered in the past. The desired solution is for a power allocation that considers the power limitations of a satellite system and the diversity needs of the user terminals. Prior art tools to arrive at the desired solution is Convex Programming and Artificial Intelligence search methods such as Genetic Programming.

Linear Programming methods were generally used in the prior art to solve network routing problems. In these, the Multiple Satellite System can be considered a network with the primary path as the "highest elevation satellite". The highest elevation satellite has the least "cost" with respect to instantaneous power usage. Overflow paths can be considered as the next highest elevation satellite. Unfortunately, this model breaks down when considering diversity and limits on battery Depth of Discharge. The power allocation problem is to find single path or multiple paths depending upon the desired level of diversity. This model also does not apply when satellites are given priority because of battery or thermal system conditions.

The Linear Programming method of the prior art is a technique for optimizing an objective with a number of constraints with a linear problem structure. "Barrier" methods use an interior search approach. These methods are extremely effective for large problems with large numbers of variables. Tight bounds can be defined for the computational time of a problem.

The Convex Programming method of the prior art is a technique for reducing the computational burden for solving nonlinear, but convex problems. The convergence and rate of convergence for the barrier methods are well established in the context of Convex Programming methods. Convex programs can be solved at the same computational rate as Linear Problems, however, no existing large scale systems exist. Genetic Programming, another technique of the prior art, provides solutions to non-linear problems. However, no bounds can be determined for the solution time that is typical of genetic programming procedures.

Given the limitations of the prior art as discussed above, it is a first object of this invention to provide an apparatus and method for optimizing multiple satellite system capacity using a power allocation strategy that considers requirements of spatial link diversity for user terminals, satellite power limitations and self-interference considerations. This optimization minimizes loss of traffic capacity (i.e., revenue) due to misallocation of available power and diversity.

It is another object of this invention to improve the balance between a plurality of paths between a plurality of satellites and ground grid points, for improved signal to noise ratios while maintaining satellite power usage within prescribed limits.

It is yet another object of the invention to allocate diversity paths using satellites at elevation angles that will support desired signal to noise ratios while precluding the use of excessive amounts of power.

It is yet another object of the invention to provide a method of operating a satellite system that optimizes path diversity in light of battery Depth of Discharge requirements.

It is yet another object of the invention to provide a method of operating a satellite system that optimizes power allocation and diversity derived single path or multiple paths when one or more satellites of a plurality of satellites are given priority related to battery or thermal system limitations.

SUMMARY OF THE INVENTION

The foregoing and other problems are overcome and the objects of the invention are realized by a satellite communications system operative with at least one existing terrestrial communication system for carrying communications traffic. The system comprises a plurality of satellites in earth orbits, each of the satellites radiating one or more forward links containing the traffic to one or more terrestrial users. Each forward link of each of the satellites has a maximum radiation limit. At least one terrestrial user is capable of concurrently receiving at least two of the forward links. These concurrently received two forward links redundantly contain the traffic addressed to the user. The system also has one or more terrestrial gateways that are bidirectionally linked to one or more satellites of the plurality of satellites for carrying the traffic. A computing center, linked to the gateways, has a traffic controller for allocating traffic to the satellites using the gateways. The traffic controller uses a fading model that is descriptive of fading characteristics for each of the one or more forward links; a link performance model descriptive of losses in each of the one or more forward links; and a power allocation model for computing a traffic allocation for each satellite of the plurality of satellites in accordance with the fading model and the link performance model. The traffic allocation defines radiation for each of the one or more links in each satellite of the plurality of satellites. The defined radiation is less than the maximum radiation limit for each of the one or more redundant links.

The traffic controller may be located within a gateway so as to optimize traffic associated with that gateway alone. The optimization may also be directed to minimize total radiation from all forward links for one or more of the plurality of satellites.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

This invention is intended to support gateways of a Multiple Satellite Communications System and ground operational control center operators in the allocation of satellite power to mobile users. This invention describes an apparatus and method for calculating link capacity for a Code Division Multiple Access (CDMA) system to allocate diversity paths between grid points of aggregated mobile users and a plurality of satellites. The power allocation is designed to meet a desired quality of service (Signal-to-noise-interference ratio), and a derived availability (average link outage probability) at minimum system power. The link capacity calculation includes exact expressions for self-interference. The invention is also applicable as a tool for the analysis and control of link assignments.

Figure 1:
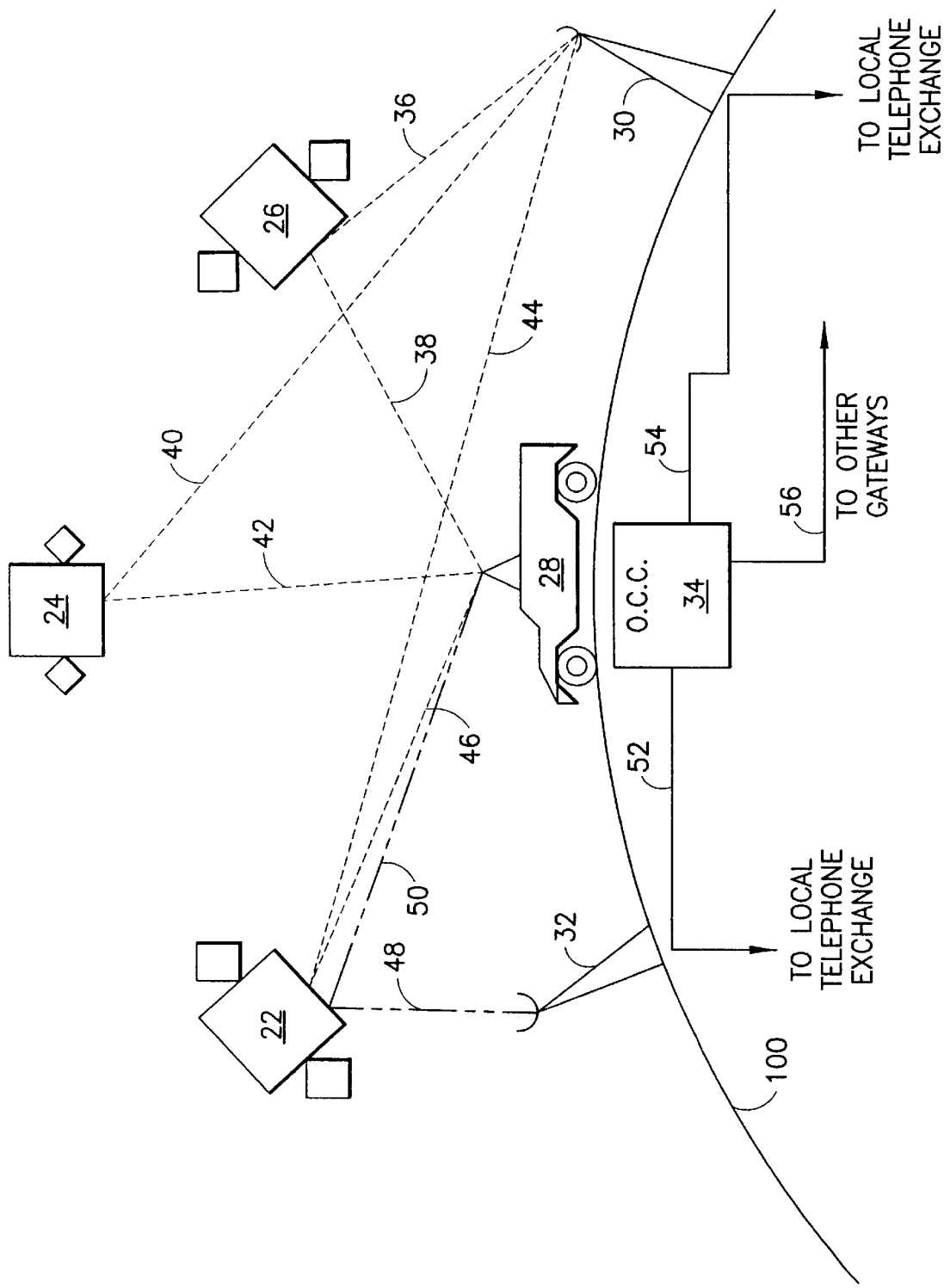
FIG. 1 is a diagram of a satellite communication system where the Communication Link Allocation System (CLAS) of this invention operates.

The Communication Link Allocation System (CLAS) operates as part of an Operational Control Center (OCC). As shown in FIG. 1, traffic control of an exemplary constellation of satellites 22, 24, and 26 can be achieved by using ground based points, such as gateways 30 and 32 located on terrestrial surface 100. Gateways 30 and 32 have a list of channel allocations for each satellite 22,24,26 available to a particular gateway as a function of time for linking to a mobile user 28. Also, each gateway 30 or 32 can allocate traffic to each channel on the list. It is understood that mobile user 28 can also be a concentrator where traffic from multiple users is collected for transmission to/from satellites 22, 24 and/or 26. Generally, gateways 30 and 32 are connected to the public switched telephone network (PSTN), perhaps directly to the local telephone exchange. The public network can be viewed, in general, as a traffic concentrator for routing traffic to satellites 22, 24 and/or 26.

Operation control center (OCC) 34, for example, updates traffic allocation for each specific satellite to gateways 30 and 32 via links 52 and 54. Links 52 and 54 can be implemented using either conventional ground connections, cellular links, or satellite links. Similarly, link 56 connects to other gateways to collect and distribute information required by each gateway for its traffic allocation. OCC 34 is a central computing point that computes the future allocation of traffic to each satellite in accordance with this invention. The gateways 30 and 32, in turn, implement the allocation of traffic computed by OCC 34 to their respective satellites after having been given the traffic allocation by OCC 34.

In general, in FIG. 1 the user 28 can be served by gateway 30 using one of three possible transmission paths. First, gateway 30 can use satellite 26 to reach user 28 via links 36 and 38. Second, the same gateway 30 can reach user 28 by via satellite 24 using links 40 and 42. Third, gateway 30 can use satellite 22 to reach user 28 using links 44 and 46. Hence, OCC 34 can optimize traffic allocation by choosing which satellite, 22, 24 or 26 is to carry traffic passing through either gateway 30 or gateway 32, destined for user 28.

Assuming a non-geosynchronous satellite system, such as a low earth orbit satellite constellation case, as the satellites 22, 24, 26 move in their orbits the gateway 30 must re-allocate the path of communications traffic to and from the user 28, for example from satellite 22 to satellite 24. The satellite 22 may be low on the horizon with respect to gateway 30, and may have a low state of charge (SOC) of the on-board battery system. If the orbital path of satellite 22 takes it lower on the horizon with respect to gateway 30, transmission and reception power requirements may soon exceed allowable power limits, hence traffic from user 28 is preferably shifted from satellite 22 to a better situated satellite with a better state of charge (SOC), such as satellite 24 or satellite 26. In the alternative, if no adequate substitutes for satellite 22 can be linked by gateway 30, the traffic from user 28 may be re-routed to gateway 32 for operation in conjunction with links 48 and 50. This re-routing of traffic from gateway 30 to gateway 32 is directed by messages from, and in conjunction with computations by, the operations control center (OCC) 34. For diversity, user 28 can be serviced, for example, from satellite 24 and 26 concurrently. In effect, user 28 would link with gateway 30, through links 40 and 42 using satellite 24, while also using links 36 and 38 using satellite 26. In this instance, links 38 and 42 would carry the information to user 28 redundantly, thereby increasing the quality of reception by user 28. OCC 34 coordinates traffic to exemplary user 28, and associated handoffs, using link 54 to gateway 30, link 52 to gateway 32 and link 56 to other gateways.

The input to OCC 34 is the expected traffic by geographic area, e.g., grid points, and channels. A set of instantaneous constraints and satellite operational policy is also input. The output from OCC 34 to the gateways 30 and 32 is a power allocation over time in the future. The future time is limited, typically, only by the accuracy of the satellite orbital calculations.

The Operational Control Center 34 provides services for a plurality of service areas each comprising a plurality of users, similar to exemplary user 28. Service areas, in general, are geographic locations operated by a single entity.

It should be noted that the Communication Link Allocation System of this invention is not limited to operation in OCC 34. The optimization aspect of the invention can be used locally, for example by gateway 30. As part of the software residing at gateway 30, the CLAS receives actual traffic service requests, and makes decisions on diversity paths and power usage for traffic passing through gateway 30.

Figure 2:
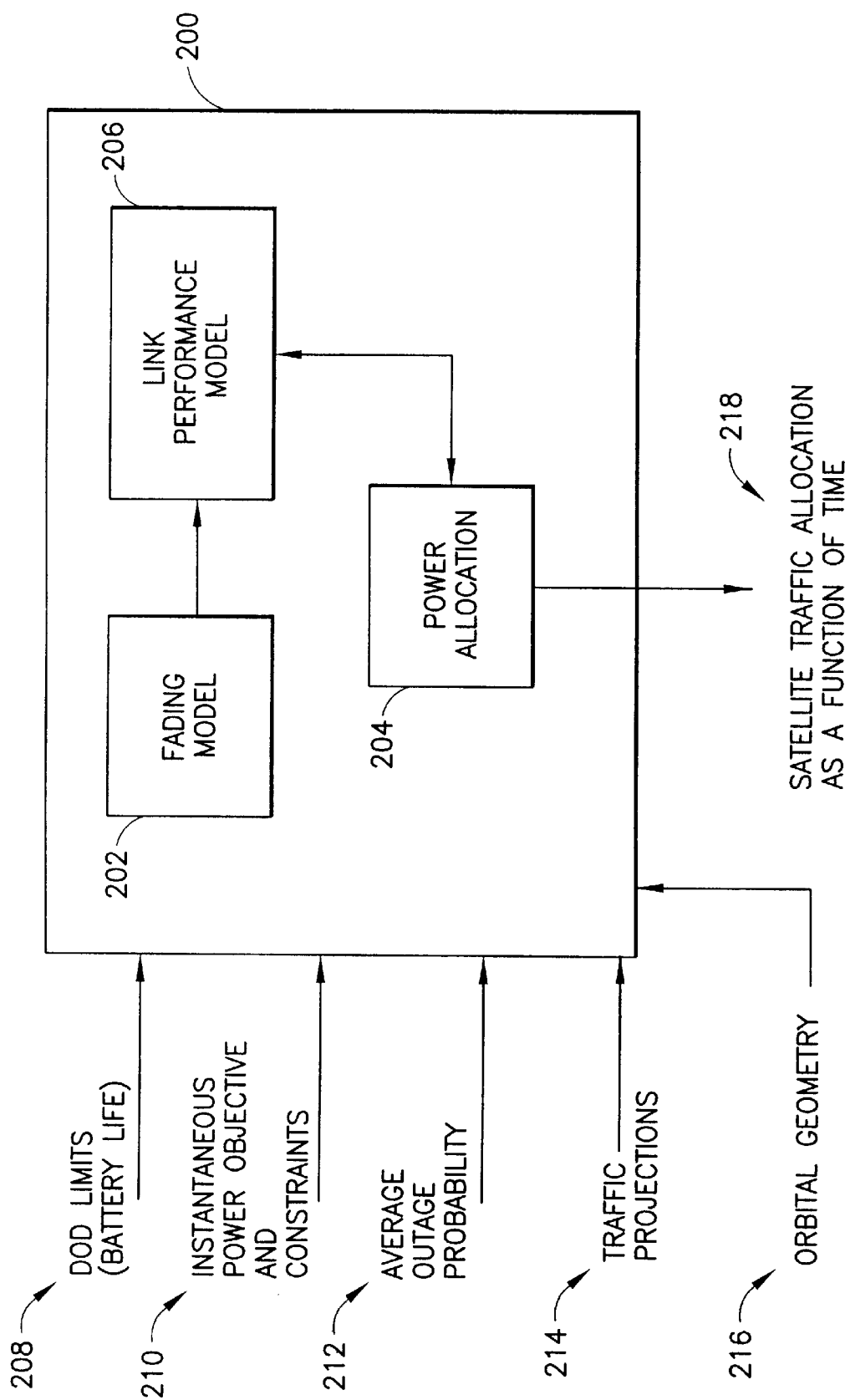
FIG. 2 is a block diagram of the Communication Link Allocation System (CLAS) of this invention.

In accordance with FIG. 2, the Communication Link Allocation System (CLAS) 200 of the present invention includes a fading model 202, a link performance model 206, and a power allocation model 204. These various models are described in detail below. The output from CLAS 200 is a satellite traffic allocation 218 for all satellites currently linked to one or more gateways, such as the gateways 30 and 32.

One input to the CLAS 200 is a desired limit on battery depth of discharge (208), which is selected to assure battery longevity of each satellite. For example, this limit could be set at 70%, indicating that each satellite battery is not to be discharged more than 30 percent of its full charge over a full orbit, or over the length of a simulation interval.

Another input to CLAS 200 is instantaneous power objectives and constraints (210) which specify the maximum power available for each time increment over the simulation interval, and which include constraints of instantaneous power and link availability in a multiple satellite CDMA self-interference and fading environment.

A forecast of communications traffic, traffic projection (214), is also input to CLAS 200. This forecast over the simulation interval may be derived from historical records of a service provider for each service area.

Future orbital geometry data (216), projected over the length of the simulation interval, is input to allow computations by the CLAS 200. This data is relatively constant and requires update only when a satellite is repositioned in its orbit. Combining future orbital geometry data 216 with the traffic projection 214 allows the computation of link losses for each particular satellite over its orbit associated with each terrestrial grid point.

In general, the Communication Link Allocation System 200 determines a future best power allocation (218) considering constraints of instantaneous power, link availability in a multiple satellite CDMA self-interference and the fading environment. The link performance model 206 receives an instantaneous power objective and constraints 210 for a given user traffic detailed by projection 214. User traffic is aggregated at terrestrial grid points. CLAS 200 also receives constraints on satellite power, beam power, gateway power and power flux density limits as part of input 210. An availability constraint on links is provided as an average outage probability input 212. CLAS 200 then determines an optimum amount of power that each gateway is allocated for a satellite on a beam and in a channel. The choice of satellite for each link can be modified based on external satellite control policies to preserve satellite lifetime. This is accomplished by applying a set of satellite weights as part of the objective function, such as the DOD limits 208. The objective to minimize power on satellites is biased towards high priority or low priority satellites. These priorities include considerations of satellite peculiarities such as thermal or battery limits, exemplified by DOD limits 208.

In a preferred embodiment the CLAS 200 is implemented in software on a digital computer having a display, such as a graphic display console, for communicating the results 218 to operators. Alternatively, the Communication Link Allocation System could be implemented on a multiprocessor system for improved computational performance.

The software is designed to be modular, wherein fading model 202, link performance model 206, and power allocation 204 are, optionally, run independently. A multiprocessor system wherein each of these models are run independently is envisioned with data being exchanged between models 202,204 and 206 at the end of each simulation time interval or other convenient time. Since each model is run on a separate processor, parallel processing is achieved thereby speeding up each separable operation and providing real time results.

For example, running at OCC 34, the results from CLAS 200 computations are stored and used to model future traffic density and satellite battery conditions for each satellite available to the gateways in simulation increments of, for example, one second, ten seconds, or one minute. CLAS 200 displays the traffic allocation results 218 of this simulation, for each desired time increment, to human operators for real-time confirmation while it also generates traffic allocation instructions to gateways under its control, such as gateway 30 and 32.

The inputs to CLAS 200, specifically 208, 210, 212, 214 and 216, should be periodically updated to insure that CLAS simulated future values are accurate, i.e. representative of actual conditions during the simulation interval. Any substantial departures of the simulated parameters from actual values experienced in the satellite network, as derived from actual, (now historical) satellite telemetry data can be used to refine the projection mechanism for each individual input. Typically it is user traffic projections 214 that need to be updated and refined relatively frequently, due to the changing nature of this input. Depending on traffic changes, and the quality of traffic projections 214, these update periods may be quite long, reducing the need for immediate communication between OCC 34 and the gateways. It is also noted that traffic projections 214, a variable with a relatively high rate of change, may need to be updated frequently, and can be transmitted directly from a service provider associated with the user 28 and forwarded to OCC 34 via link 52 for updating the CLAS 200 simulation.

OPERATION

As shown in FIG. 2, CLAS 200 contains three processing modules, the fading model 202, the link performance model 206, and the power allocation module 204.

The fading model 202 provides input to the link model 206 to support the determination of diversity paths. The fading model uses numerical fits to empirical measurements of fading. The fading model is then used as part of the link availability constraint. This allows diversity paths to be chosen because of their functional benefit, as compared with an ad hoc decision such as the highest elevation satellite.

Thus computed, the allocation 218 is transmitted to the gateways 30 and 32 for use in directing traffic to satellites 22, 24 and 26. The result is an optimized allocation of future incoming traffic routed via satellites 22, 24 and 26, using gateways 30 and 32 in accordance with the computed allocation 218. Allocation 218 also optimizes the redundant information carried by a plurality of links to user 28.

POWER ALLOCATION 204

The power allocation function 204 determines the best path or paths for a given signal power. It does this by collecting a set of constraints which represent the link quality of service, the average probability of outage representing the availability due to fading, and instantaneous power constraints.

The power allocation function 204 generates a matrix containing all constraints, including the link path gain constraint, for use by an optimizer. The optimizer solution is the power allocation 218 to be sent to the gateways 30 and 32.

The link quality of service is represented by a Signal-to-Noise Interference parameter. The interference model is viewed with respect to a point on the ground at a traffic concentrator node, and includes the following interference components or sources.

Gateway-to-gateway interference. This interference occurs when gateways share the same channel on one satellite. This interference can be avoided by only allocating one gateway per channel on a satellite.

Satellite-to-satellite interference. This interference occurs when gateways use the same channel on different satellites. This interference can be avoided by allocating a gateway the same channel across all satellites in view of the traffic concentrator.

Beam-to-beam interference. This interference occurs due to the inadvertent use of side lobes on a satellite. This interference is reduced by diversity combining the signals appearing in the strongest side-lobes.

The average probability of outage (212) is the result of the diversity strategy and the fading model. There are three types of diversities discussed herein for the forward link : 1-path, 2-path and 3-path. The user terminal design generally limits the diversity to a maximum of 3-path, however the teaching of this invention is not limited to only 3-path diversity.

Figure 3:
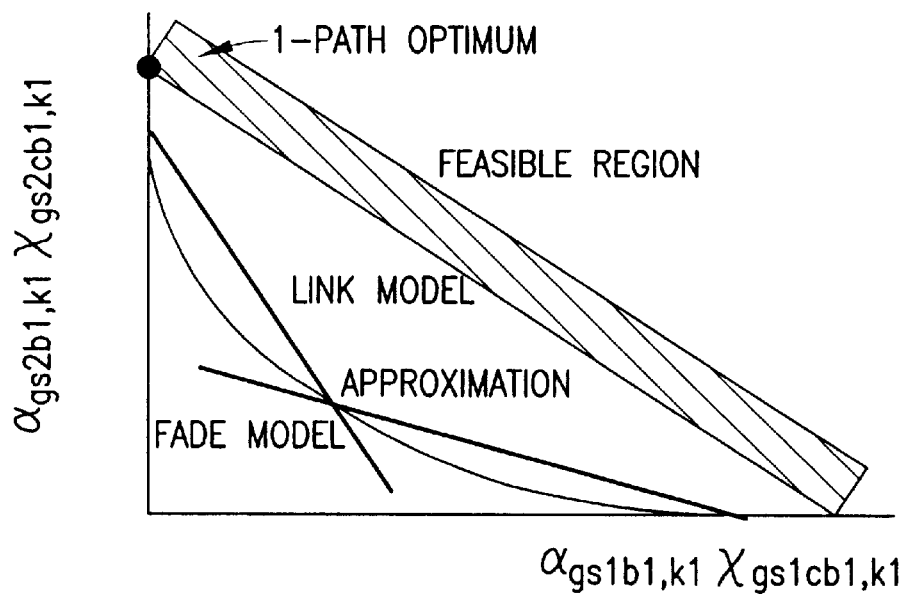
FIG. 3 illustrates a feasible region of solutions for a one path user terminal link.

FIG. 3 illustrates a feasible region of operation for a diversity combiner. Two received signal powers at a grid point k are plotted. One signal path, e.g., using satellite 1, beam 1, is plotted against the other signal power received on the second path, e.g., satellite 2 beam, 1. The link equation is shown as a straight line. This condition would occur when the noise terms are constant. Plotted on the same axis is the average probability of outage at a constant value, 0.05, for an assumed fading model. A piecewise linear approximation to the average probability of outage is also illustrated. The optimum solution occurs on either axis because the outage probability is small.

Figure 4:
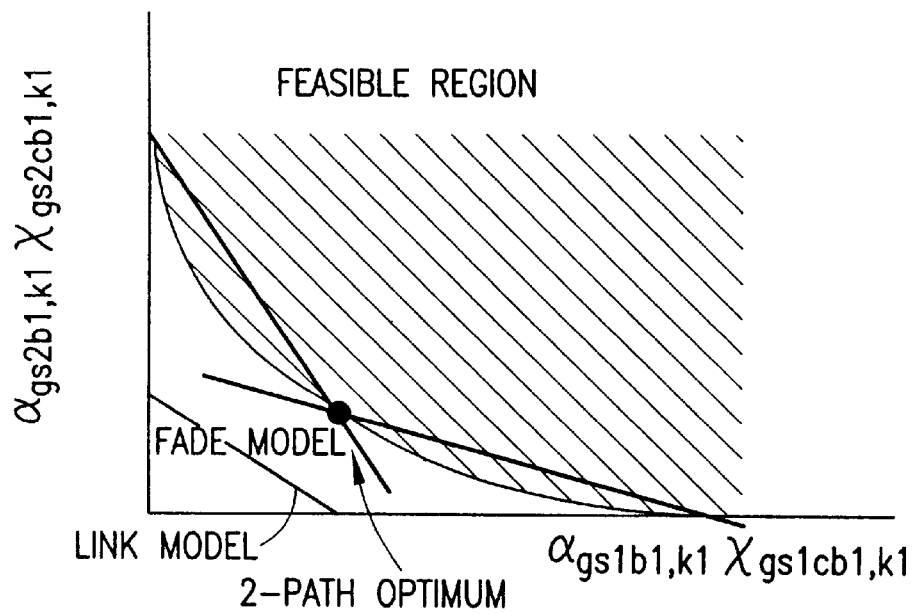
FIG. 4 illustrates a feasible region of solutions for a two path user terminal link.

While FIG. 3 shows the 1-path solution occurring with a large probability of outage, FIG. 4 illustrates the feasible region under the same conditions with a larger average outage probability, about 0.01. The optimum solution occurs at a point where the receive powers on both paths are in balance. In FIG. 4, the 2-path diversity solution occurs when a smaller probability of outage is desired.

The most efficient condition for the diversity combiner is when the received powers are balanced. However, this is not the optimum total system power solution when the path gains are not balanced. The power allocation optimization considers all of the trade-offs between availability, link closure, and total satellite power.

The power limits described by instantaneous power objective and constraints 210 generally include:

instantaneous satellite power limit;
  instantaneous beam power limit;
  instantaneous power flux density; and
  instantaneous gateway power limit.

The state value has four subscripts, one for each object. The upper case letters represent the number of objects:

G=number of gateways;
  S=number of satellites in the system;
  I=the number of satellites viewed from a point on the ground in a particular situation;

C=the number of channels;
B=the number of beams; and
K=the number of grid points.

The system gains are defined as G, with subscripts for receiving r, transmitting, t, by the satellite, s and gateway—g. L represents system power losses for the forward uplink and downlink. There are free space losses and miscellaneous losses. Exemplary S-band antenna (satellite to user) gains are incorporated as a function of satellite elevation angle.

F1 is the performance function to be minimized. The summations provide the total satellite power.

$$F1: \sum_{s=1}^{S}\sum_{g=1}^{G}\sum_{c=1}^{C}\sum_{b=1}^{B} G_{sr} \cdot G_{st} \frac{x_{gs,cb}}{L_{ufsl} \cdot L_{umisc}}$$

F2 is the constraint on gateway transmitted power. The limit on gateway power could be the result of a High Power Amplifier (HPA) limit, or any equipment limitation. A gateway with only some of the CDMA equipment, or with limited terrestrial interfaces is represented as a power limit. There is a separate constraint for each gateway antenna=G*I constraint equations.

$$F2: \forall_{g,s} \sum_{c=1}^{C}\sum_{b=1}^{B} x_{gs,cb} - P_{hpa} \leq 0$$

F3 is a constraint on any satellite beam power to be 25% of the total satellite power. There is a constraint for every beam on every satellite=S*B.

$$F3: \forall_{s,b} \sum_{g=1}^{G}\sum_{c=1}^{C} G_{sr} \cdot G_{st} \cdot \frac{x_{gs,cb}}{L_{ufsl} \cdot L_{umisc}} - \frac{1}{4}P_{limit} \leq 0$$

F4 is the power flux density constraint, and is calculated for each beam of each satellite. There are S*B of these constraints.

$$F4: \forall k\ \forall s,c \sum_{g=1}^{G}\sum_{b=1}^{B} \left\{ \frac{G_{sr} \cdot x_{gs,bc}}{L_{ufsl} \cdot L_{umisc}} \cdot \frac{G \cdot G_{st} \cdot G_r}{L_{dfsl} \cdot L_{dmisc}} \right\} \cdot \frac{4,000}{Bw \cdot Area_b}$$

F5 is derived from the limitation of instantaneous satellite power.

$$F5: \forall s \sum_{g=1}^{G}\sum_{c=1}^{C}\sum_{b=1}^{B} G \cdot \frac{G_{sr} \cdot x_{gs,bc}}{L_{ufsl} \cdot L_{umisc}} - P_{limit} \leq 0$$

Signal to Noise Ratio Model

Figure 5:
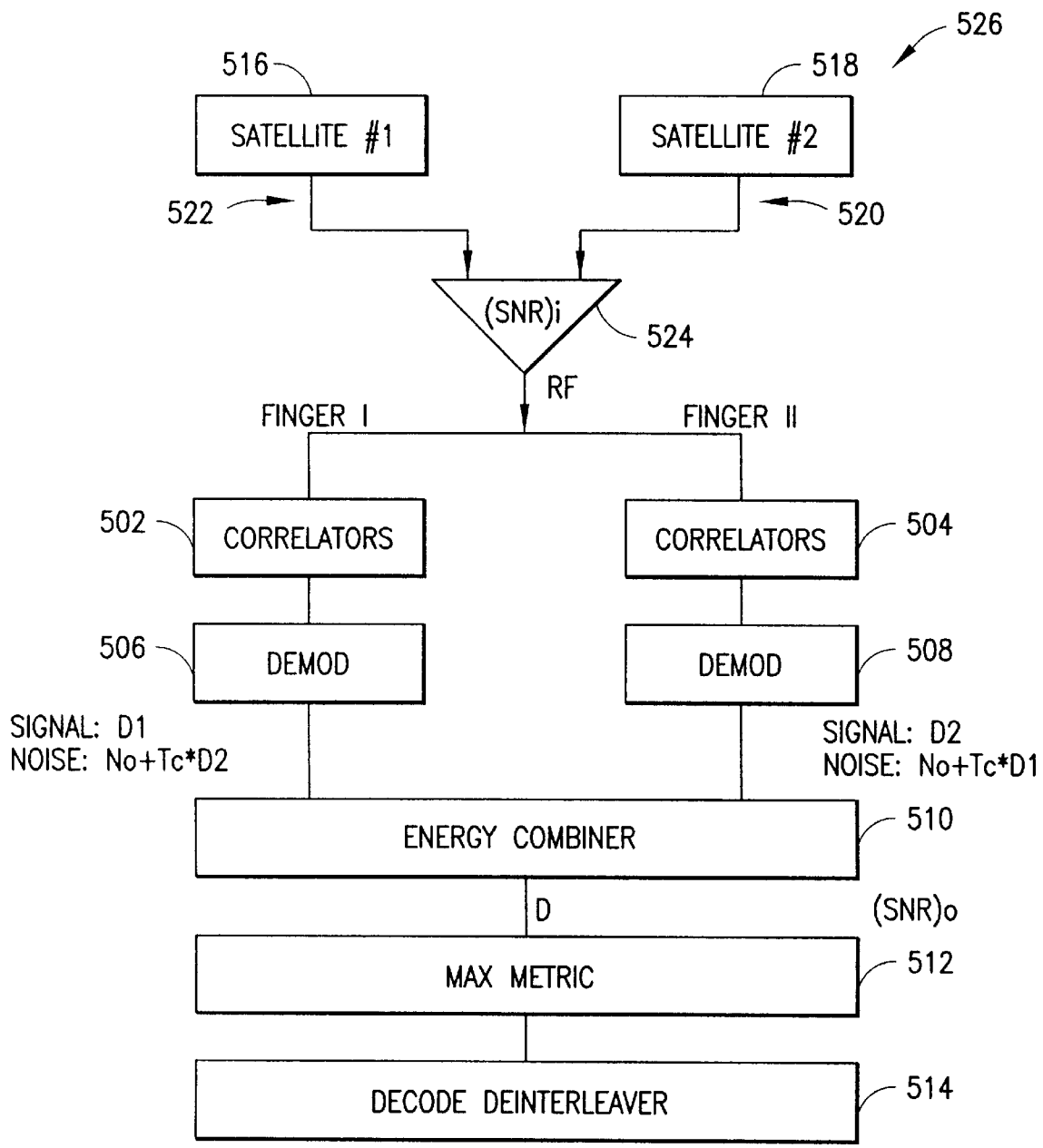
FIG. 5 is a block diagram of a typical diversity combiner.

As part of Link performance model 206, the output signal-to-noise plus interference ratio, SNR, at the user terminal, a user terminal model is detailed. FIG. 5 illustrates an exemplary user terminal communications receiver having a two finger diversity combiner.

The RF signals from satellite 516 using link 522 and from satellite 518 using link 520, inclusive of noise, are received by summer 524. The composite signals and noise are then sent to both finger 1 and finger 2 of the diversity combiner. The information, or traffic, sent via forward link 522 from satellite 516 is the same as that sent by forward link 520 from satellite 518. Since satellite 516 is not co-located with satellite 518, there is path redundancy for the transmitted traffic (voice or data). The redundancy in received information is used by receiver 526 to increase the quality of the signal received, i.e., to increase the SNR.

After passing through correlators 502 and 504, and demodulators 506 and 508, the baseband signals are referred to as D1 and D2, respectively. The noise present is the thermal noise, plus the interfering signals from the other fingers times the chip rate, Tc.

For an optimum coherent (i.e., amplitude) diversity combiner, the SNR is the sum of the signal to noise ratio of each path. Each combiner path receives signal energy per data bit, $E_b$, divided by the total noise power density, $N_o$. This is achieved by energy combiner 510, max metric 512, is thus given by: and decode de-interleaver 514. The SNR is thus given by:

$$SNR = \forall_{g,c,k} \sum_{s=1}^{S}\sum_{b=1}^{B} \frac{E_b}{N_0}$$

The user signals sharing the same channel are assumed orthogonal. Therefore, there is no interference from other users, or the pilot signal in the same channel from the same satellite. signal power is assumed equal for all users at a grid point. The actual user signal power is determined by the power control system.

Grid points are terrestrial locations with aggregations of active users. Grid points are assumed to receive different amounts of power. The power received depends upon the decision variable $a_{gsb,k}$, and the elevation and azimuth angles between the satellites in view and a particular grid point.

Fading & Diversity Model 202

All instantaneous power constraints and fading properties are considered simultaneously in a convex programming solution to power allocation. Convex functions include the description of fading and link availability, and link amplifier components. Piece-wise linear approximations to the convex functions can be used to provide fast optimal solutions using Linear Programming.

A purpose of the diversity strategy is to predict the aggregate strategy of gateways for diversity path decisions. The diversity combiner in the forward link is a coherent amplitude combiner. The link equation is the sum of the signal to noise of each path. The return link uses a non-coherent diversity combiner. The link equation is the sum of signals divided by the sum of noises. The non-coherent combiner is linear. The coherent combiner can be bound by the linear non-coherent combiner by the following approximation.

$$\frac{\alpha_{gs1b1,k1} \cdot x_{gs1cb1,k1}}{N_1} + \frac{\alpha_{gs2b1,k1} \cdot x_{gs2cb1,k1}}{N_2} \geq \qquad (1)$$

$$\frac{\alpha_{gs1b1,k1} \cdot x_{gs1cb1,k1} + \alpha_{gs2b1,k1} \cdot x_{gs2cb,k1}}{N_1 + N_2} \geq SNR$$

Fading Model

The fading model is represented by a probability distribution such as Rayleigh or Rician. The fading is assumed to impact the signal amplitude. The signal phase is assumed known because of a demodulator tracking loop. Next is performed a derivation of the probability of outage for single- and double-path communication systems. The received SNR for each both system is assumed to have Rayleigh distributions due to fading, and the link is considered to be "out" when the value of the SNR is less than a value, B.

A. Single-Path Communication System

The received SNR is assumed to have a probability density function (p.d.f.) of $$f_{R_1}(r_1) = \frac{r_1}{\sigma_1^2} e^{-\frac{r_1^2}{\sigma_1^2}}, r \leq 0 \qquad (2)$$

It is noted that the variable has the mean value of $\sigma_1\sqrt{\pi/2}$ and variance of $(-\pi/2)\sigma_1$.

The probability of outage can be determined as follows:

$$P_{out} = prob(R_1 < B) = \int_0^B f_{R_1}(r_1)dr_1 = 1 - e^{-0.5\gamma^2} \qquad (3)$$

$$\text{where } \gamma \equiv \frac{B}{\sigma_1}. \qquad (4)$$

It is seen that g must be no larger than 0.1417 (−8.5 dB) if $P_{out}$ is to be less than 0.01.

B. Double-Path Communication System

The received total SNR, denoted as $R_T$, using the maximal diversity combining, is given by $$R_T = R_1 + R_2 \qquad (5)$$

where $R_1$ and $R_2$ are the output SNRs of paths 1 and 2, respectively. It is assured that $R_1$ and $R_2$ are independent random variables having Rayleigh distribution with parameter values of $s_1$ and $S_2$, respectively. Then we obtain the following expression for $P_{out}$:

$$P_{out} = Prob(R_T < B) = \qquad (6)$$

$$Prob(R_1 + R_2 < B) = \int_o^B \int_0^{B-r_2} f_{r_2} r_2 f_{R_1}(r_1) dr_1 dr_2 =$$

$$\int_0^B \frac{r_2}{\sigma_2^2} \exp\left(-\frac{r_2^2}{\sigma_2^2}\right) \left\{\int_0^{B-r_2} \frac{r_1}{\sigma_1^2} \exp\left(-\frac{r_1^2}{\sigma_1^2}\right) dr_1\right\} dr_2$$

$$P_{out} = \qquad (7)$$

$$1 - \frac{1}{1+\alpha^2} \exp\left(-\frac{\gamma^2}{1+\alpha^2}\right) \left[\exp\left(-\frac{(\gamma\alpha)^2}{2(1+\alpha^2)}\right) - \exp\left(-\frac{(\gamma/\alpha)^2}{2(1+\alpha^2)}\right)\right] -$$

$$\exp\left(\frac{\gamma^2}{2\alpha^2}\right) - \frac{\gamma\alpha\sqrt{2\pi}}{2(1+\alpha^2)^{3/2}} \exp\left[-\frac{\gamma^2}{2(1+\alpha^2)}\right] erf\left(\frac{\gamma}{\alpha\sqrt{2(1+\alpha^2)}}\right)$$

Where $$a = s_2/s_1 \qquad (8)$$

$$g = B/s_1 \qquad (9)$$

and $$erf(a) = \frac{2}{\sqrt{\pi}} \int_0^a e^{-t^2} dt = \text{the error function of argument } a.$$

Link Performance Model 206

Model Figure Summary

1. Diversity strategies are a result of optimizing power allocation, or a heuristic.
2. One variable, x, is used to describe all of the system power. This simplifies the expressions for constraints such as gateway power limits.
3. The complete forward link is mathematically modeled.
4. The model captures an exact interference environment.
5. The model can be expressed as constraints without "hardcoding" a flow from input to output. This means that the same model can be used to answer different questions: minimizing power resources given traffic, capacity and feasibility of configurations.
6. The path gain is described by a constant in equation 9. This permits a useful separation of decision variables from link gain.

Model Assumption Summary

The following assumptions are made in the creation of this model:

1. User signals are assumed orthogonal from the same gateway in the same channel, on the same satellite and beam.
2. All users at a grid point receive equal power.
3. Pilot power is modeled as a constant per channel.
4. Beacons are modeled as a constant per satellite.

Simplifying Assumptions

1. Satellite transponder gain and return link filter switching is modeled as a fixed constant.
2. The Forward Error Correction Coder (FECC) gain is not modeled.
3. Imperfect power control is modeled as a fixed power margin.
4. Rayleigh fading is modeled as equal uncertainty on all fingers of the diversity combiner.
5. Only mobile and handheld user terminals are modeled.

The forward link closure model is described as an analytical expression for the Signal-to-Noise Interference ratio at the user terminal. The forward link model considers the effects of the diversity combiner and the general interference environment. The decision parameter, x, is the power allocated from a gateway, g, to a satellite, s, on channel, c, in a beam, b. The forward link model aggregates users to grid points, k. The power variable, $x_{gs,cb,k}$, is the power allocated to a grid point.

Table 1 details the notation convention. This convention is to use subscripts to indicate system component indices and superscripts as further description of the term. Lower case letters are indices. Upper case letters represent the maximum value of those indices.

TABLE 1 terminology for the link model

| TERM | DESCRIPTION | UNITS |
|---|---|---|
| $G_g^t$ | The gateway transmitting antenna gain. | ratios |
| $G_s^r$ | The C-band satellite receiving antenna gain. | ratios |
| $L_{g,s}^u$ | The uplink free space loss which is a function of the elevation angle from gateway-g to satellite-s. | ratios |
| $L_{misc}^u$ | The uplink miscellaneous loss, a fixed constant. | ratios |
| k | Boltzman constant. | W/K-hz |
| $T_{ueff}$ | Effective uplink noise temperature at the input port of a satellite. | deg-K. |
| $B_T$ | Total satellite transponder bandwidth. | MHz |
| $G_s^a$ | The transponder amplifier gain is generated at the output of the transponder. | ratios |
| $S_{s,b}$ | Power for a satellite beam. | W |
| $P^{i\,mod}$ | Intermodulation caused by the amplifiers non linearity. | W |
| $G_k^r$ | The user's receiving antenna gain at a grid point; a function of elevation angle. | ratios |
| $\eta_o^u$ | is the uplink thermal noise power spectral density | W/Hz |
| $G_{s,b}^t$ | average satellite transmitting antenna gain | ratios |
| $L_{sb,k}^d$ | Downlink free space loss from satellite-s to gridpoint-k, this depends on the elevation angle of the k-gridpoint to the beam-b of the satellite-s. | ratios |
| $L_{misc}^d$ | Miscellaneous downlink loss | ratios |
| $\eta_o^d$ | the Downlink thermal noise power spectral density | W/hz |
| SNIR | user's signal energy per data bit divided by the total noise power density | ratios |
| $N_o$ | total noise power density | W/hz |
| $W_{sb,k}$ | coherent combiner weights | ratio |

TABLE 1-continued terminology for the link model

| TERM | DESCRIPTION | UNITS |
| --- | --- | --- |
| $\alpha_{gsb,k}$ | path gain matrix | ratio |
| $X_{gs,cb,k}$ | power sent by a gateway, in a channel, on a satellite, in a beam for a grid point | watts |
| $S_{gs,cb,k}$ | power received by a grid point from a gateway, on a satellite, in a beam, in a channel | watts |
| $C_{gscb,k}$ | number of users at a grid point on a channel | circuits |

Forward Link Block Diagram

Figure 6:
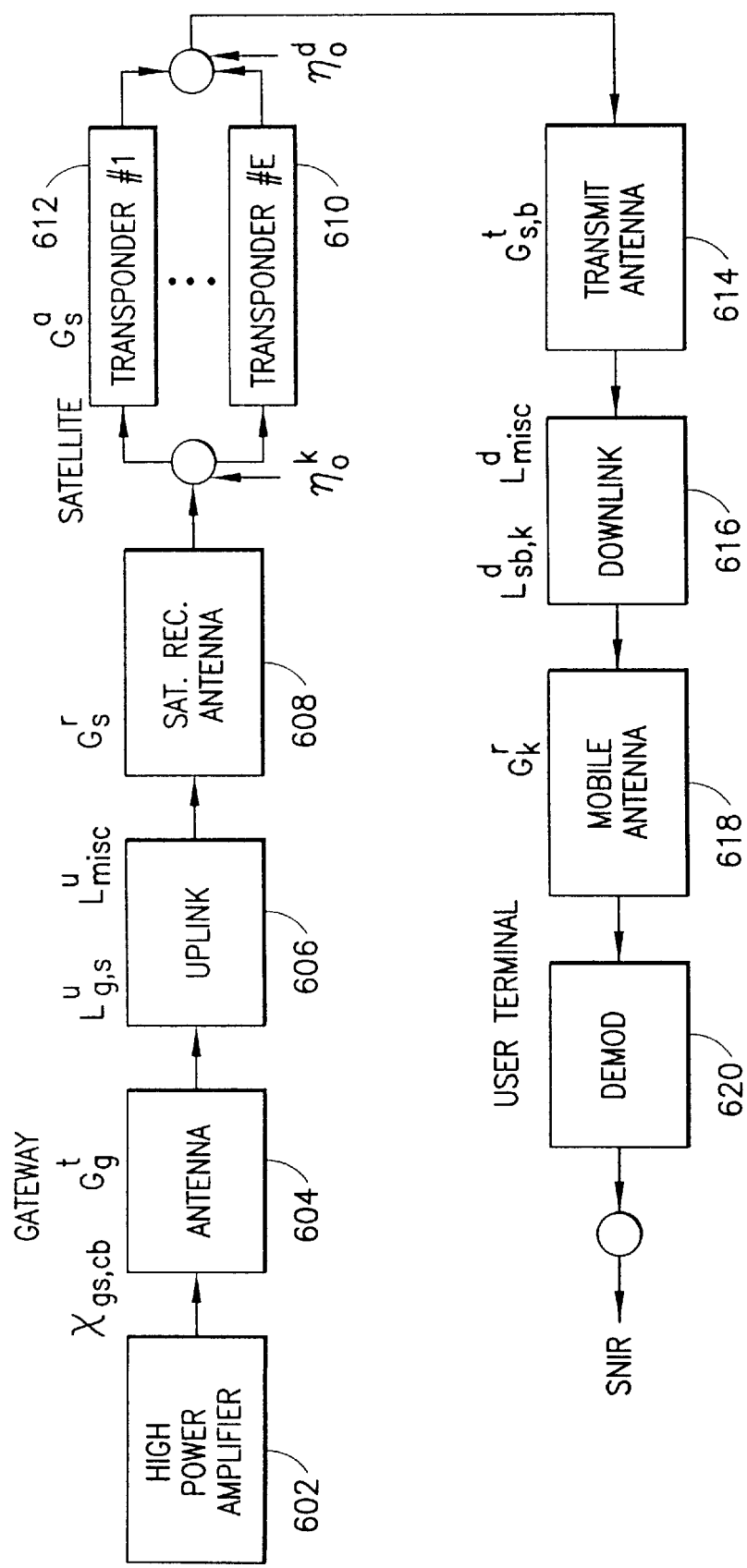
FIG. 6 is a link model end-to-end block diagram.

The link performance model 206 provides a path gain description of the entire forward and return link as a function of satellite position. To end-to-end forward link for one satellite path is illustrated in FIG. 6. FIG. 6 details the parts of model 206 which provide the computation of self-interference in a wide variety of situations. The self-interference terms include gateway-to-gateway interference, satellite-to-satellite, interference and beam-to-beam interference.

The forward link starts at the gateway node, with high power amplifier 602 passing traffic information to antenna 604 for uplink 606. Satellite receiving antenna 608 receives the information and distributes it to transponders 610 to 612. The transponders beam the information down to mobile antenna 618 via transmit antenna 614, and downlink 616. Demodulator 620 in the user terminal decodes the information received from mobile antenna 618. Each signal that takes a path from a gateway through a satellite to a user terminal is processed with a separate demodulator in the user terminal. Other signals taking the same path are considered orthogonal to the desired user terminal signal. Interference includes other signal paths, and interference from other beams in the same channel. A separate pilot power signal per channel is used to establish the user terminal acquisition and tracking. All signals, including the pilot, are assumed to be Code Division Multiple Access (CDMA).

Forward—Uplink

Gateway transmitted signal power:

The gateway transmits CDMA signals to multiple satellites on separate beams in channels powered by the High Power Amplifier 602.

$X_{gs,cb,k}$=transmitted signal power from gateway-g to satellite-s in channel-c through beam-b.

$G_g^t$=the gateway transmitting antenna gain.

$G_s^r$=the C-band satellite receiving antenna gain.

$L_{g,s}^u$=the uplink free space loss which is a function of the elevation angle from gateway-g to satellite-s.

$L_{misc}^u$=the uplink miscellaneous loss, a fixed constant.

This constant contains terms for the signal overhead, line loss, and polarization loss.

Satellite receive power:

The received signal power at the satellites, from gateway-g in channel-c, for beam-b to grid point k is $$S_{gs,cb,k} = x_{gs,cb,k} \cdot \frac{G_g^t \cdot G_s^r}{L_{g,s}^u \cdot L_{misc}^u} \quad (1)$$

The total received signal power at the satellite-s for beam-b is $$S_{s,b} = \sum_{g=1}^{G} \sum_{c=1}^{C} S_{gs,cb} \quad (2)$$

The total received noise power at the satellite-s for beam-b is $$N^u = \eta_o^u \cdot B_T \quad (3)$$

where $\eta_o^u$=uplink thermal noise power density=$k^* T_{eff}^u$, k=Boltzman constant, $T_{eff}^u$=effective uplink noise temperature at the input port of a satellite, and $B_T$=total satellite transponder bandwidth The input driving power to a transponder for beam-b is $$P_{s,b}^i = S_{s,b} + N^u \quad (4)$$

Satellite Output Power:

The output power of the satellite transponder is a result of the amplifier gain being a function of the input power level and the nonlinear effect of the amplifier.

$$P_{s,b}^o = G_s^a(S_{s,b}) + G_s^a(S_{s,b}) \cdot N^u = P^{imod} \quad (5)$$

where $$N^u << S_{s,b}$$

$P^{imod}$ accounts for the extraneous node due to intermodulation caused by the amplifier,s non-linearity. The value of $P^{imod}$ is a fixed function of $P_{s,b}^o$, roughly 5%. The transponder amplifier gain, $G_s^a$, is generated at the output of the transponder. A piece of wise linear approximation to the transponder gain.

The total retransmitted noise power spectral density from the satellites through beam-b is $$\eta_{os} = G_s^a(S_{s,b}) \cdot \eta_o^u + \frac{P^{imod}}{B_T} \text{watt/Hz} \quad (6)$$

where $\eta_o^u$ is the uplink thermal noise power spectral density.

Forward—Downlink User Terminal receive power

The mobile user terminal is modeled. The fixed and handheld user terminals are not part of this simulation.

The total user's received thermal noise power spectral density is $$\eta_{ok} = \eta_o^d + \eta_{os} \cdot \left( \frac{G_{s,b}^t \cdot G_k^r}{L_{sb,k}^d \cdot L_{misc}^d} \right) \quad (7)$$

where $G_{s,b}^t$=average satellite transmitting antenna gain in the main beam-b for a particular user terminal at grid point-k, the gain is a function of elevation angle and azimuth angle.

$G_k^r$=the user's receiving antenna gain at a grid point; a function of elevation.

$L_{sb,k}^d$=Downlink free space loss from satellite-s to gridpoint-k, this depends on the elevation angle of the k-gridpoint to the beam-b of the satellite-s.

$L_{misc}^d$=miscellaneous downlink loss—this includes fading, line losses, and imperfect power control. Fading is included in the propagation loss term.

$\eta_o^d$=the Downlink thermal noise power spectral density.

The received signal power at a grid point-k, from the gateway-g, through the satellite-s, in channel-c, through beam-b is $$S_{gs,cb,k} = G_s^a(S_{s,b}) \cdot \frac{G_g^t \cdot G_s^r}{L_{g,s}^u \cdot L_{misc}^u} \cdot \frac{G_{s,b}^t \cdot G_k^r}{L_{sb,k}^d \cdot L_{misc}^d} \cdot x_{sg,cb,k} \quad (8)$$

$$= \alpha_{gsb,k} \cdot x_{sg,cb,k}$$

The path gain matrix, $\alpha_{gsb,k}$, is a function of elevation angle between grid point-k and beam-b of satellites, and elevation angle between gateway-g and satellites. If the grid point or the gateway cannot see the satellite, that is an elevation angle less than 10 degrees, than $\alpha_{gsb,k}$=0.

Channels are allocated to grid points. The number of users at a grid point, on a channel is Cm(k,c,m). The index m is the mode, either handheld, mobile or fixed. At any point in time these users can be translated to be equivalent number of user circuits required on a satellite.

The received signal power for any one user from gateway-g through beam-b of the satellite-s is $$u_{gs,cb,k} = \frac{S_{gs,cb,k}}{C_{gscb,k}} \quad (9)$$

where $C_{gscb,k}$=the number of users in channel-c, on satellites, in beam-b, assigned to gateway-g at grid point k.

In general, there is a different number of users in each satellite beam associated with a finger of diversity path. The user received signal is the coherent summing of the signal amplitudes of each finger. The user's signal energy per data bit is $$E_b = T_b \forall_{g,c,k} \cdot S_{gs,cb,k} \cdot A_{gs,b,k} / C_{gscb,k} \quad (10)$$

where $A_{gs,b,k}$=is the assignment for services of the grid point-k by the gateway-g through the beam-b of satellite-s. $w_{sb}$ is the combiner weight. The elements are "1" if the grid point-k is in the service area of gateway-g, and are "0" otherwise.

The total noise power spectral density due to thermal noise, self-interference is the sum of the thermal noise for each finger and Is=self-interference due to non-orthogonal coded signals, which are the signals from the same gateway, in the same channel, through other satellites. The total noise spectral density is also a sum of Ib=adjacent beam interference from all sources in channel-c, at grid point-k from beams other than the main beam, and Ig=other service area interference due to signals from other gateways, but in the same channel.

$$N_0 = A_{gs,b,k} \cdot \left( \eta_{ok} + T_c \cdot \left\{ \sum_{g1=1}^{G} \sum_{s1=1}^{S} \sum_{b1=1}^{B} \alpha_{gsb,k} \cdot x_{g1s,cb1,k} \right\} - T_c \cdot \alpha_{gs,cb,k} \cdot x_{gs,cb,k} \right) \quad (11)$$

The inner summation includes all interference terms: Is, Ib, and Ig and the desired signal. The negative term represents the power for users in the same gateway, beam, and channel as the desired signal. This negative term is not interference because of orthogonality. The inner summation is taken over all beams, b1, of satellite, s1 for the intended satellite-s and beam-b being process by the diversity finger.

The total interference includes all adjacent channels interference and external interferences:

Ic=adjacent channel interference from all sources in the channel-c, at the grid point-k. This is modeled as a constant, (3%), factor of the received signal power.

Iext=external interference from other CDMA service providers and from satellites in adjacent spectrum.

The optimization model is comprised of a constant matrix containing the path gain and constrains on the decision variable, $x_{gs,cb}$. The entire link can be represented as a constant path gain matrix described in equation 9. This path gain is a function of gateway to satellite to grid point at a point in time. There is one constrain equation per grid point.

Best Mode—Power Allocation Experiments

All experiments contain a test generator and a data analysis component. The test generator component contains the following objects:

A configuration component is used to establish the test situation.

The load test stresses the system under different traffic conditions.

The data analysis component contains the following objects:

A visualization component is a graphical display of test results along with the desired test results.

The valid result object contains the expected results of the test.

The "unit under test" is the Communication Link Allocation System. A test generator contains the geometric and load objects. The data analysis object contains the decision logic associated with valid results and a visualization system.

The test operations include the following:

set UUT inputs for A, b and f

A is the constraint matrix.

This matrix is derived from See (visibility relationship), Akg (service area ownership relationship), Offset (start time of satellite track), el,az (traffic concentrator to satellite angles) elg,azg (gateway to satellite angles), Cm (circuits on a channel at a traffic concentrator)

b is right hand side of the constraint matrix. It is derived from parameter limits.

f is the coefficients of the objective function.

run UUT get UUT x and active static constraints x is a vector which can include the following variables:

gateway power per satellite per channel per beam total number of users at a grid point power per circuit for a gateway, satellite, beam and channel total number of users on a satellite beam in a channel for a gateway active constraints are as follows:

satellite power limit beam power limit

PFD limit gateway power limit

SNIR desired

Derive measurements

Derive measurements are as follows:

total interference power/circuit for a (gscb)

energy per bit Eb total gateway power total satellite power total beam power number of users per channel Experimental results The experimental results are described by finite state machines and graphical illustrations of the validation. The tests are coded by GSCB, K values: number of gateways, number of satellites, number of channels, and number of beams, number of grid points.

Test 1—three satellite test code:
Three satellite test codes: G S C B,K=1 3 1 1, 1

Description: The minimum power limit on each satellite is found at each beam location. This limits are used to calculate the maximum number of users allowed. This number of users is given to the UUT.

Invariant: The number of users is calculated by the link closure equation with power equal to the smallest power limit on each satellite.

Figure 7:
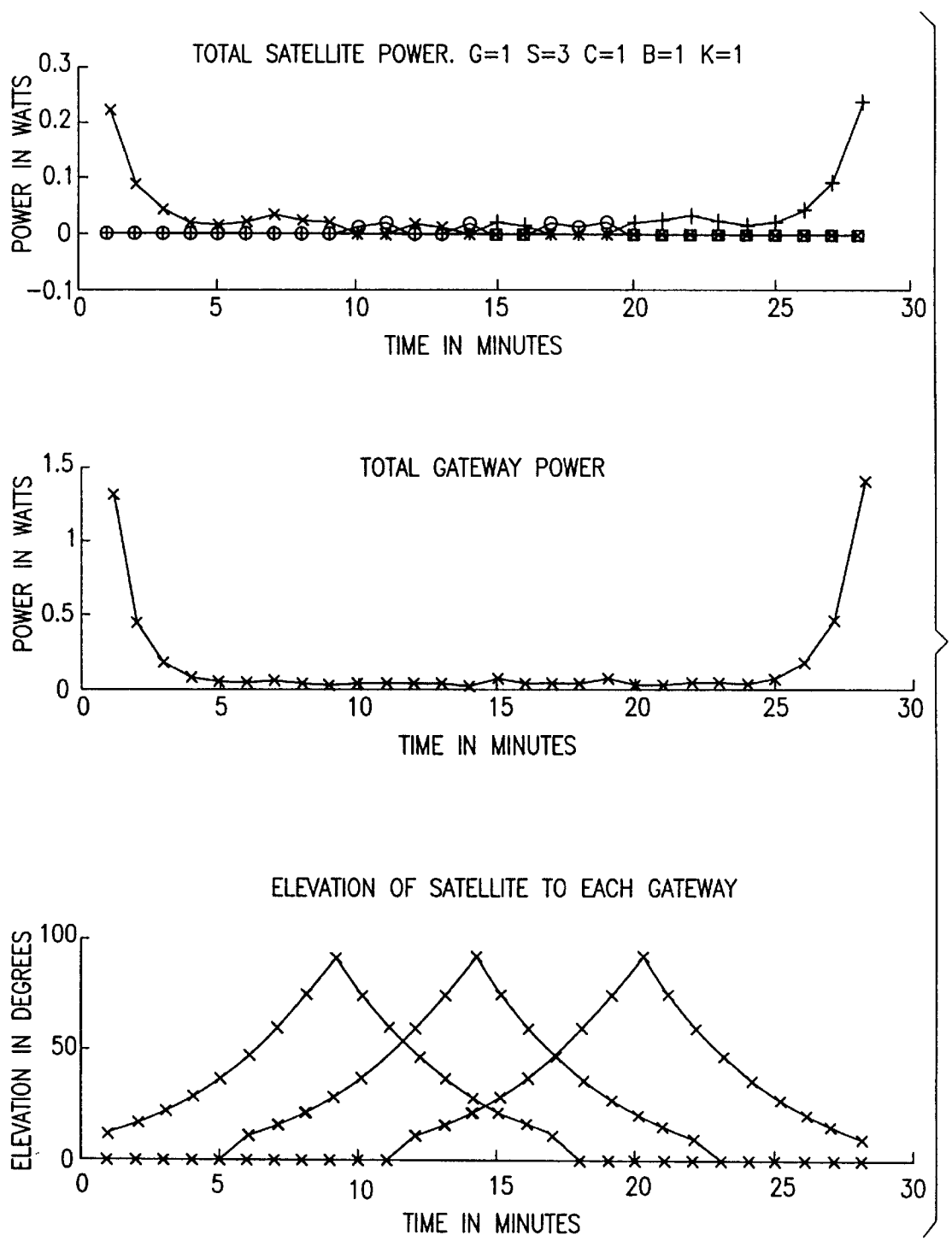
FIG. 7 is a plot of one-path diversity decision versus time.

Results: FIG. 7 shows the results of the simulation for 1 path diversity decision versus time.

Test 2 Configuration: The configuration sweeps two satellites over one traffic concentration point over time.

Valid Results: There is no interference. The satellite power is symmetric over time. The calculated maximum number of users shall be a feasible solution.

Double satellite with a service area boundary code: G S C B,K=2 2 1 2, 8

Description: There are eight grid points equally split between service areas. The satellite motion is tangential to the service area boundaries. Two beams of each satellite are swept across the grid points. There is perfect symmetry between the service areas.

Invariant: The signals at grid points of one service area are gateway-to-gateway interference terms for the grid points in the other service area.

Configuration: Satellite beams overlap during the time progression. Each grid point sees each satellite from 10 degrees elevation to 90 degrees elevation and back to 10 degrees elevation.

Valid Results: At a grid point in the center of the motion, the self-interference is due to all three components: satellite-to-satellite, beam-to-beam interference, and gateway-to-gateway interference. The dual diversity paths are used to minimize total satellite power.

Figure 8:
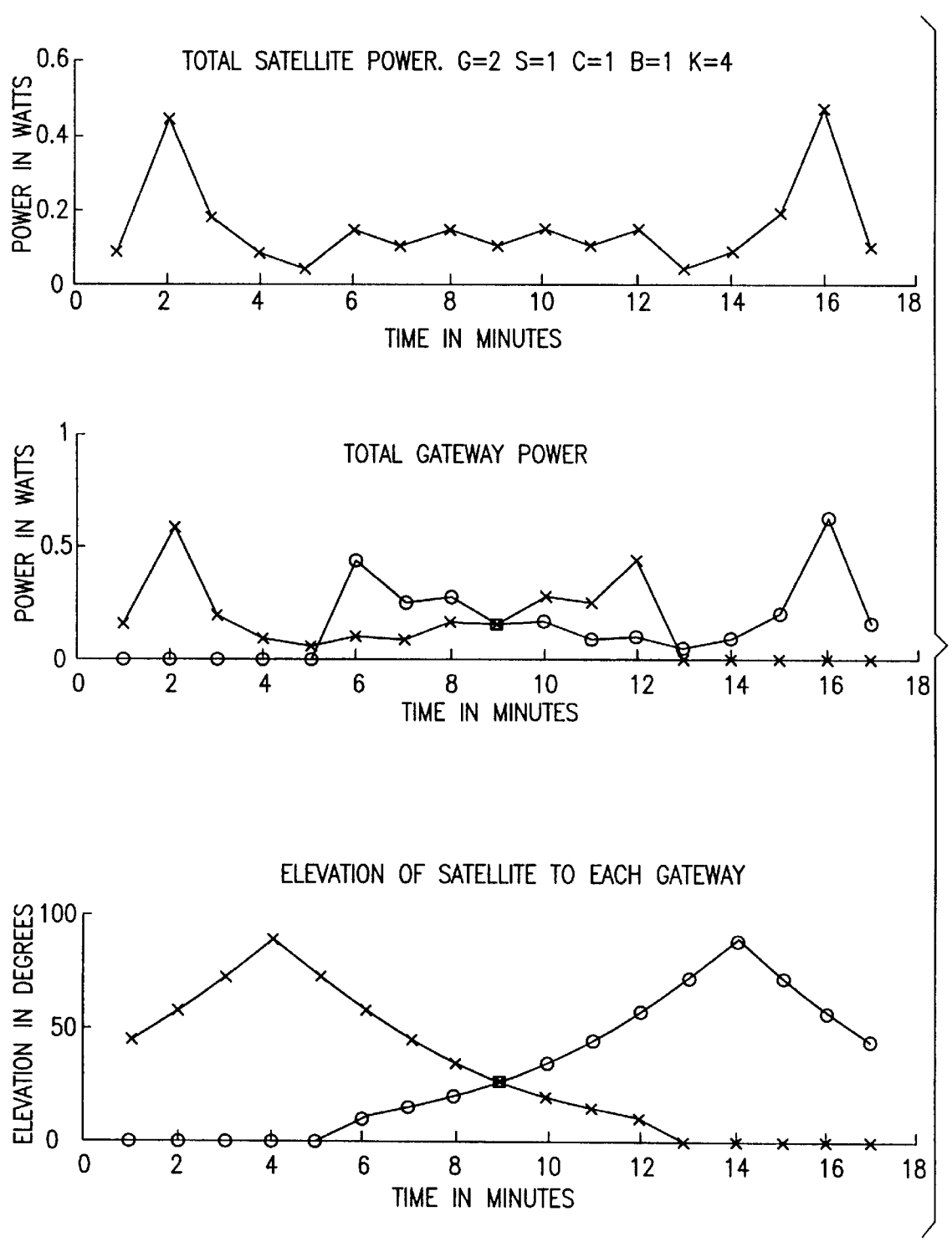
FIG. 8 is a plot of two-path diversity decision versus time.

FIG. 8 shows a plot of 2 diversity path decision versus time for the case where G=2, S=1, C=1, B=1, and K=4

Figure 9:
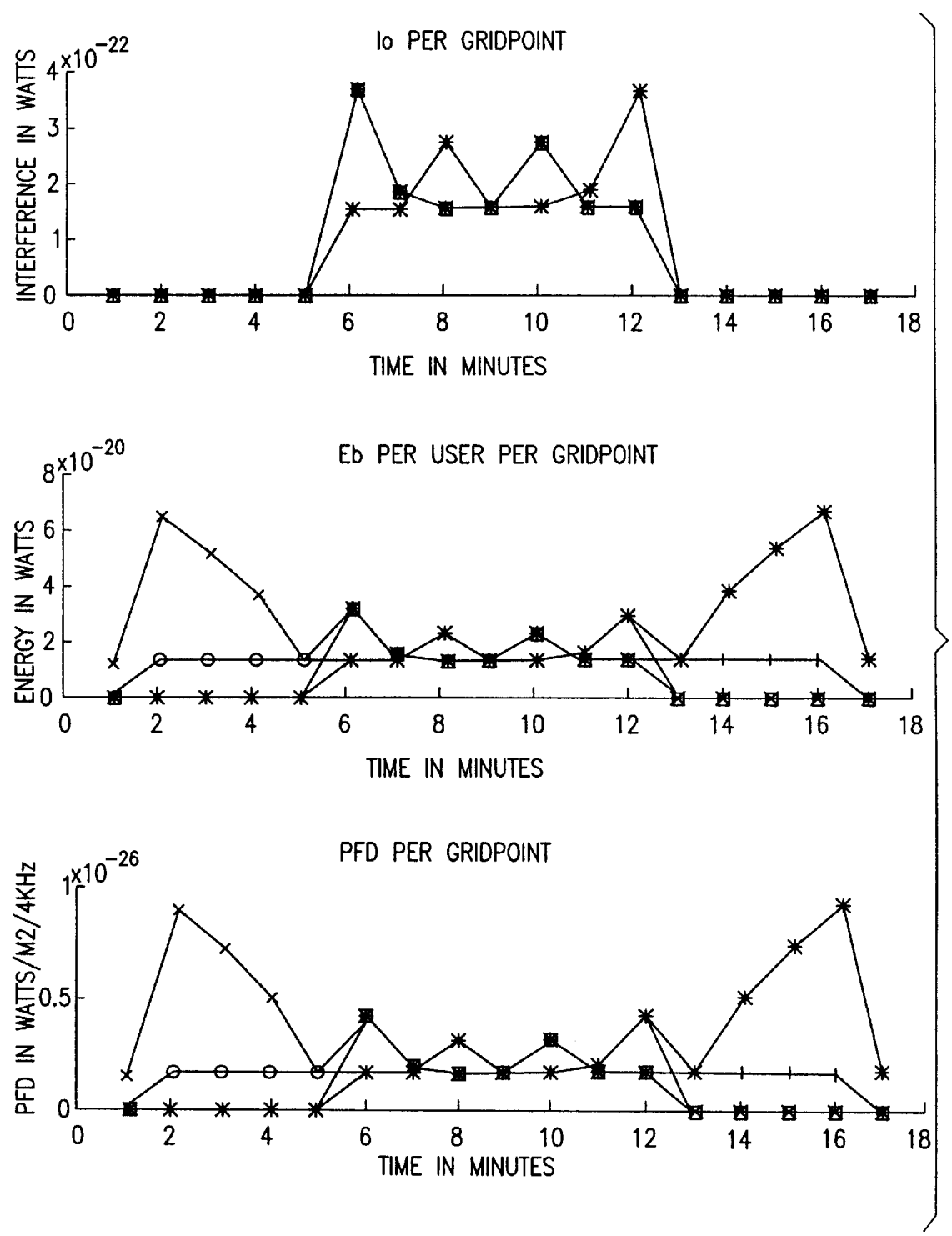
FIG. 9 is another plot of one-path diversity decision versus time.

FIG. 9 shows a plot of 1 path diversity decision versus time detailing simulated noise performance of the system, and uses the same conditions as FIG. 8.

Another operational requirement for satellite systems is that link diversity accommodate blockages and shadowing for mobile and hand held transmission points. The slower feedback power control loop cannot effectively compensate for the fast occurring, i.e., <10 Hz, blockages in mobiles. Likewise, head masking occurring in the hand held terminals cannot be fully compensated for with power control.

This invention provides a novel application of mathematical programming techniques to the CDMA link power allocation in a multiple satellite system. The application allows an operator to use high level system performance measures including system power (capacity measure), SNIR (system quality of service) and average link blockage probability (availability) to determine the best power allocation. The invention chooses the best satellites for each diversity link. There is no built in logic to pick certain satellites. Instead the performance objectives and constraints are used to decide on the best satellite and the amount of power.

The teaching of this invention scales to any size power allocation problem, from one service area to all service areas in the world. This scaling enables the method to be used for link allocation in the Operational Control Center and/or in the separate gateways.

While the invention has been particularly shown and described with respect to preferred embodiments thereof, it will be understood by those skilled in the art that changes in form and details may be made therein without departing from the scope and spirit of the invention.

What is claimed is:

1. A satellite communications system operative with at least one existing terrestrial communication system for carrying communications traffic, comprising:
    a plurality of satellites in earth orbit, each of said satellites transmitting one or more forward links containing said traffic to one or more terrestrial users,
    one or more terrestrial gateways, said gateways being bidirectionally linked to one or more satellites of said plurality of satellites for carrying said traffic;
    a computing center, linked to said gateways; and
    a communication link allocation system for calculating optimized available resources and for allocating said traffic according to said optimized resources, said communication link allocation system comprising:
        first means to generate and store a fading model descriptive of fading characteristics for each of said one or more forward links;
        second means to generate and store a link performance model descriptive of losses in each of said one or more forward links including said fading model; and
        third means to generate and store a power allocation model based on power constraints for each satellite and said fading model and said link performance model, said third means computing a traffic allocation solution based on said models which allows said communication link allocation system to allocate traffic in accordance therewith.

2. The satellite communication system of claim 1, wherein said traffic control means is part of one or more of said gateways.

3. The satellite communication system of claim 1, wherein said traffic control means is part of said computing center, and wherein traffic allocation results output from said traffic control means are transmitted to said gateways.

4. The satellite communication system of claim 1, wherein said traffic allocation is optimized to minimize total radiation from all forward links for one or more of said plurality of satellites.

5. The satellite communication system of claim 1, wherein said traffic allocation results in downlink radiation for each of said one or more links in each satellite of said plurality of satellites, said radiation being less than said maximum radiation limit for each of said one or more links.

6. In a satellite communication system operative with at least one existing terrestrial communication system, said communication system comprising a plurality of satellites, a plurality of terrestrial user terminals, and at least one terrestrial gateway for establishing communication links between the user terminals and the terrestrial communication system via one or more of the satellites, and further comprising a communications link allocation system, a method of allocating communications traffic comprising the steps of:
    computing a fading model descriptive of fading characteristics in each of said one or more communication links;
    computing a link performance model including said fading model descriptive of losses in each of said one or more forward links;

computing a power allocation model based on power constraints for each satellite and said fading model and said link performance model, and computing a traffic allocation solution based on said models which allows said communication link allocation system to allocate traffic in accordance therewith.

7. A method as set forth in claim 6, wherein the communications link allocation system is located apart from the at least one gateway, and further comprising a step of transferring the traffic allocation solution to the at least one gateway.

8. A method as set forth in claim 6, wherein the power allocation model includes an interference model, including a gateway-to-gateway interference model, a satellite-to-satellite interference model, and a beam-to-beam interference model.

9. A method as set forth in claim 6, wherein the communications traffic is allocated so as to provide links though a plurality of satellites for individual ones of the user terminals.

10. A method of allocating communications traffic as described in claim 6, wherein the constraint information includes information descriptive of satellite battery usage, satellite orbital geometry, power objectives and constraints, average outage probability, and future traffic projections.

* * * * *